UNITED STATES PATENT OFFICE.

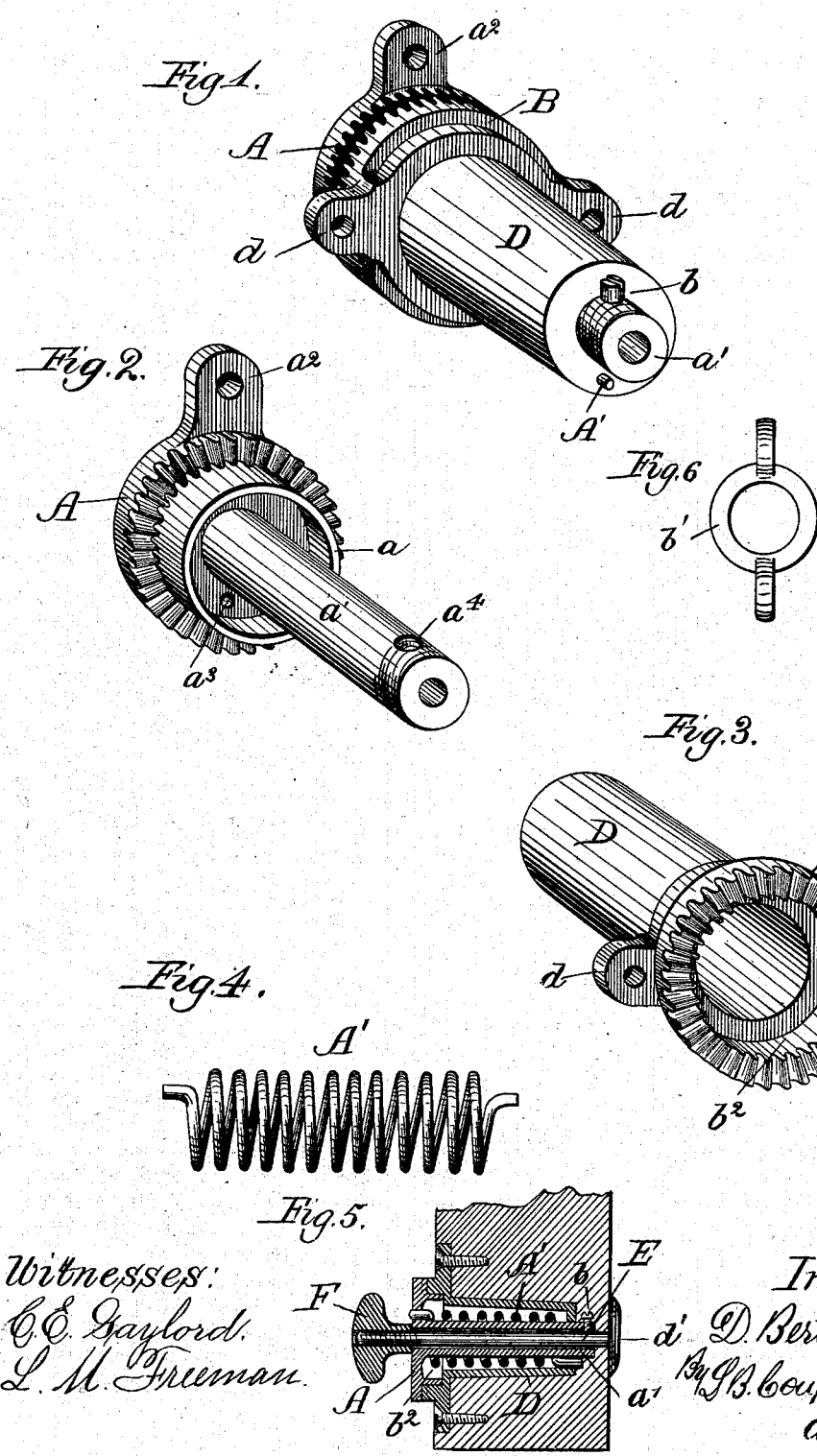

D. BERT HARTLEY, OF CHICAGO, ILLINOIS.

CLUTCH MECHANISM.

SPECIFICATION forming part of Letters Patent No. 276,688, dated May 1, 1883.

Application filed October 28, 1882. (No model.)

*To all whom it may concern:*

Be it known that I, D. BERT HARTLEY, of Chicago, county of Cook, and State of Illinois, have invented certain new and useful Improvements in a Clutch Mechanism, of which the following is a full, clear, and exact description, that will enable others to make and use the same, reference being had to the accompanying drawings, and to letters of reference marked thereon, forming a part of this specification.

This invention relates to improvements in a clutch or clamping mechanism which may be used for various purposes, but is more especially designed for use in connection with the pivoted arms and adjustable head-rests of reclining-chairs.

Figure 1 is a view in perspective of a clutch device embodying my improved features. Figs. 2 and 3 show the two principal parts detached from each other. Fig. 4 is a view of the spring used between the two parts shown in Figs. 2 and 3; Fig. 5, a longitudinal section, showing the manner of attaching the device. Fig. 6 is a detached detail.

Referring to the drawings, A represents a clutch-disk provided with a toothed or serrated inner edge, the teeth projecting in the line of its axis. The inner face of the disk A is provided with the annular rim $a$ and the tubular stem $a'$, adapting these parts to engage with the companion part B. The lateral projecting perforated lug $a^2$ is for the purpose of attaching this part to the object. The perforation $a^3$ receives one end of the spring A', for the purpose of imparting the necessary tension to the same, and holding it to its proper place when the teeth are not engaged. The perforation $a^4$ in the end of the prolongation $a'$ is for the purpose of receiving the stop-pin or set-screw $b$. This end of the stem $a'$ is also screw-threaded for the reception of the correspondingly-threaded hand-nut $b'$, which serves to regulate the distance between the faces of the disks A and B, or to hold them rigidly together. The companion part or ratchet-disk B is provided with teeth on the inner face, which correspond with similar teeth in the disk A, and adapt these parts to engage with each other. The recess $b^2$ receives the rim $a$ and the projecting sleeve D, forming an integral part of the disk B, and provides a chamber for the reception of the spiral spring A'. The opposite ends of the spring are inserted through the perforations in the end of the sleeve D and the perforation $a^3$, as shown in Figs. 2 and 3 of the drawings. The stem $a'$ passes through on the inside of the spring, the extreme end having a bearing in the reduced opening in the end of the sleeve D, as shown in Fig. 1 of the drawings. This arrangement provides the disk A with two bearings in the companion part B, the annular rim $a$ forming the second bearing in the recessed end of the disk B. The disk B is provided with the perforated lugs $d\ d$, which serve for attaching purposes.

Fig. 5 illustrates the arrangement and position of the device when in use.

The clamping part consists of the bolt E, which passes longitudinally through the tubular stem $a'$. This bolt is provided on one end with the enlarged flat head $d'$, while the opposite end is threaded for the reception of the clamping-nut F. When the clamping-nut F is slacked back the spiral spring A' serves to throw the toothed disks out of engagement relative to each other, readily allowing the parts to be rotated and again clamped together at any desired angle. A very slight movement of the clamping-nut will suffice.

Having thus described my invention, what I claim as new, and desire to secure by Letters Patent, is—

1. The ratchet-disk A, having teeth on the inner face which project in the line of its axis, and provided with the annular rim $a$, and the tubular projecting stem $a'$, substantially as and for the purpose described.

2. The companion disk B, having a correspondingly-serrated face and the recess $b^2$, and provided with the projecting sleeve D and the attaching-lugs $d\ d$, substantially as and for the purpose described.

3. The combination, with the ratchet-disk A, provided with the annular rim $a$ and the tubular projection $a'$, of the companion disk B, provided with the recess $b^2$ and the sleeve D, whereby the part A is adapted to have a bearing at each end, substantially as described.

4. The combination, with the ratchet-disk A and the companion part B, of the spiral spring A', substantially as described.

5. The combination of the ratchet-disk A and the companion part B, the clamping-bolt E, and the clamping-nut F, substantially as described.

D. BERT HARTLEY.

Witnesses:
L. M. FREEMAN,
L. B. COUPLAND.